Aug. 11, 1936.          F. COURTLAND          2,050,877
                         ARTIFICIAL BAIT
                        Filed July 3, 1935
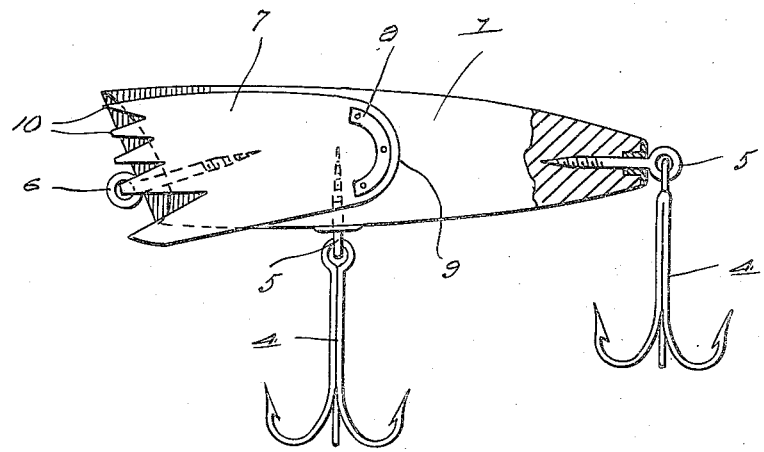
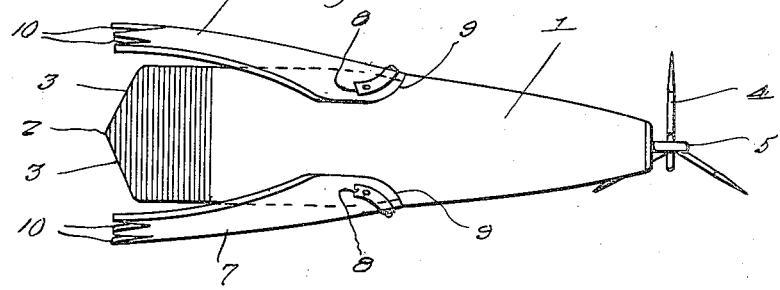
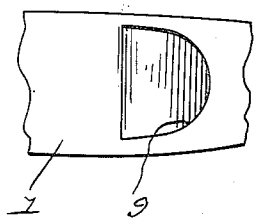
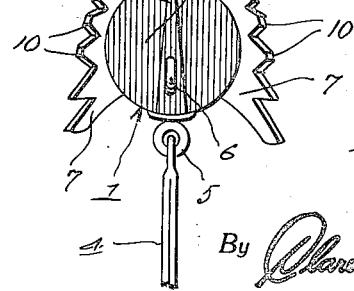
Inventor
F. Courtland
By Clarence A. O'Brien
Attorney Patented Aug. 11, 1936

2,050,877

UNITED STATES PATENT OFFICE 2,050,877

ARTIFICIAL BAIT

Frank Courtland, Eau Galle, Wis.

Application July 3, 1935, Serial No. 29,719

1 Claim. (Cl. 43—42)

The present invention relates to new and useful improvements in artificial fish baits and has for one of its important objects to provide, in a manner as hereinafter set forth, a device of this character which, when drawn through the water, will closely resemble a substantially exhausted bird which has fallen into the water and which is trying to escape therefrom.

Another important object of the invention is to provide an artificial bait of the aforementioned character which may be cast a comparatively long distance with accuracy and ease.

Other objects of the invention are to provide an artificial fish bait which will be simple in construction, strong, durable, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view partially in side elevation and partially in longitudinal section of an artificial bait constructed in accordance with the present invention.

Figure 2 is a view in top plan thereof.

Figure 3 is a front elevational view.

Figure 4 is a view in side elevation of an intermediate portion of the body.

Referring now to the drawing in detail, it will be seen that the embodiment of the invention which has been illustrated comprises an elongated body 1 of suitable material, preferably wood. The body 1 is substantially circular in cross section and tapers toward its rear end, as shown to advantage in Figures 1 and 2 of the drawing. The body 1 terminates in a substantially V-shaped, inclined forward end 2. On opposite sides of the inclined, substantially V-shaped forward end 2, the body 1 is provided with substantially flat, beveled faces 3.

The body 1 may be ornamented in any desired color or combination of colors to enhance the attractiveness thereof. Hooks 4 are secured, as by eye screws 5, beneath an intermediate portion of the body 1 and to the rear end thereof. An eye screw 6 is provided in the lower portion of the forward end 2 of the body 1 for connection with a line.

Fixedly secured to opposite sides of the body 1, at an intermediate point on said body, are resilient wings 7 of suitable material, preferably rubber. The rear end portions of the wings 7 are countersunk in the body 1 and flush therewith and firmly secured, as through the medium of plates 8 and an adhesive. Recesses 9 (see Figure 4) are provided in the body 1 for the reception of the rear end portions of the wings 7.

From their point of attachment to the body 1, the wings 7 extend forwardly adjacent said body and terminate, at their free ends, in serrations or teeth 10 adjacent the beveled faces 3.

In use, when the bait is cast, the resilient wings 7 remain close to the body 1 and, therefore, cause little resistance to the passage of the device through the air. However, when the device is drawn through the water the beveled faces deflect the water outwardly against the inner sides of the wings 7 in a manner to flex said wings outwardly, the construction and arrangement being such that the actions of a substantially exhausted bird in the water will be closely simulated.

It is believed that the many advantages of an artificial bait constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

An artificial bait comprising an elongated body tapering toward its rear end, said body including a substantially V-shaped, inclined forward end, beveled faces on said body on opposite sides of said substantially V-shaped forward end, said body having recesses in its opposite sides at an intermediate point, and resilient wings secured, at one end, in the recesses, said resilient wings extending forwardly adjacent the body and including serrations on their forward ends.

FRANK COURTLAND.